(12) United States Patent
Gubba Ravikumar et al.

(10) Patent No.: US 10,476,268 B2
(45) Date of Patent: Nov. 12, 2019

(54) OPTIMIZED DECOUPLING AND LOAD SHEDDING

(71) Applicant: Schweitzer Engineering Laboratories Inc., Pullman, WA (US)

(72) Inventors: Krishnanjan Gubba Ravikumar, Pullman, WA (US); Scott M. Manson, Moscow, ID (US); Benjamin E. Armstrong, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 107 days.

(21) Appl. No.: 15/893,405

(22) Filed: Feb. 9, 2018

(65) Prior Publication Data
US 2019/0252883 A1 Aug. 15, 2019

(51) Int. Cl.
| | | |
|---|---|---|
| H02J 3/14 | (2006.01) | |
| H02J 3/38 | (2006.01) | |
| G05B 13/04 | (2006.01) | |
| G05B 19/04 | (2006.01) | |
| G06F 1/26 | (2006.01) | |
| G06F 1/32 | (2019.01) | |

(52) U.S. Cl.
CPC ............ H02J 3/14 (2013.01); G05B 13/041 (2013.01); *H02J 3/381* (2013.01)

(58) Field of Classification Search
CPC ........ G05B 2219/24139; G05B 19/042; G06F 1/26; G06F 1/28; G06F 1/3203; G05D 23/1917
USPC ................................. 700/286, 287, 295, 297
See application file for complete search history.

(56) References Cited

U.S. PATENT DOCUMENTS

| | | |
|---|---|---|
| 4,349,744 A | 9/1982 | Reuther |
| 4,387,336 A | 6/1983 | Joy |
| 4,829,298 A | 5/1989 | Fernandes |
| 5,006,846 A | 4/1991 | Granville |
| 5,224,011 A | 6/1993 | Yalla |
| 5,341,265 A | 8/1994 | Westrom |
| 5,446,682 A | 8/1995 | Janke |
| 5,498,956 A | 3/1996 | Kinney |
| 5,592,393 A | 1/1997 | Yalla |
| 5,596,492 A | 1/1997 | Divan |
| 5,694,281 A | 12/1997 | Roberts |
| 5,703,745 A | 12/1997 | Roberts |
| 5,731,943 A | 3/1998 | Roberts |
| 5,963,404 A | 10/1999 | Guzman |
| 6,028,754 A | 2/2000 | Guzman |
| 6,236,949 B1 | 5/2001 | Hart |

(Continued)

OTHER PUBLICATIONS

Scott Manson, Bharath Nayak, Will Allen, "Robust Microgrid Control System for Seamless Transition Between Grid-Tied and Island Operating Modes" 44th Annual Western Protective Relay Conference, Oct. 2017.

(Continued)

*Primary Examiner* — Michael J Brown
(74) *Attorney, Agent, or Firm* — Stoel Rives, LLP (57) ABSTRACT

The present disclosure describes load shedding management systems and methods. A load shedding management system may simulate multiple load shedding actions. Based on the simulations the load shedding management system may select a load shedding action. The load shedding management system may send a signal to trip a set of breakers to implement the load shedding action.

20 Claims, 4 Drawing Sheets

(56) References Cited

U.S. PATENT DOCUMENTS

| | | |
|---|---|---|
| 6,265,881 B1 | 7/2001 | Meliopoulos |
| 6,285,917 B1 | 9/2001 | Sekiguchi |
| 6,341,055 B1 | 1/2002 | Guzman |
| 6,356,421 B1 | 3/2002 | Guzman |
| 6,356,471 B1 | 3/2002 | Fang |
| 6,411,865 B1 | 6/2002 | Qin |
| 6,442,010 B1 | 8/2002 | Kasztenny |
| 6,446,682 B1 | 9/2002 | Viken |
| 6,603,298 B2 | 8/2003 | Guzman |
| 6,608,742 B2 | 8/2003 | Schweitzer |
| 6,662,124 B2 | 12/2003 | Schweitzer |
| 6,694,270 B2 | 2/2004 | Hart |
| 6,757,146 B2 | 6/2004 | Benmouyal |
| 6,839,210 B2 | 1/2005 | Roberts |
| 6,845,333 B2 | 1/2005 | Anderson |
| 6,946,753 B2 | 9/2005 | Kernahan |
| 7,072,744 B2 | 7/2006 | Kuwabara |
| 7,116,010 B2 | 10/2006 | Lasseter |
| 7,196,884 B2 | 3/2007 | Guzman |
| 7,319,576 B2 | 1/2008 | Thompson |
| 7,356,422 B2 | 7/2008 | Schweitzer |
| 7,457,688 B2 | 11/2008 | Szepek |
| 7,480,580 B2 | 1/2009 | Zweigle |
| 7,570,469 B2 | 8/2009 | Guzman |
| 7,582,986 B2 | 9/2009 | Folkers |
| 7,630,863 B2 | 12/2009 | Zweigle |
| 7,635,967 B2 | 12/2009 | Loucks |
| 7,660,088 B2 | 2/2010 | Benmouyal |
| 7,710,693 B2 | 5/2010 | Guzman |
| 7,761,910 B2 | 7/2010 | Ransom |
| 7,856,327 B2 | 12/2010 | Schweitzer |
| 7,903,381 B2 | 3/2011 | Fischer |
| 7,930,117 B2 | 4/2011 | Guzman-Casillas |
| 8,082,367 B2 | 12/2011 | Etheridge |
| 8,410,633 B2 | 4/2013 | Batzler |
| 8,560,255 B2 | 10/2013 | Elwarry |
| 8,965,592 B2 | 2/2015 | Manson |
| 9,008,850 B2 | 4/2015 | Manson |
| 10,310,480 B2 | 6/2019 | Manson |
| 2004/0021470 A1 | 2/2004 | Adams |
| 2004/0027748 A1 | 2/2004 | Kojovic |
| 2004/0059469 A1 | 3/2004 | Hart |
| 2004/0138834 A1 | 7/2004 | Blackett |
| 2004/0252525 A1 | 12/2004 | Aldridge |
| 2005/0144437 A1 | 6/2005 | Ransom |
| 2006/0224336 A1 | 10/2006 | Petras |
| 2006/0259255 A1 | 11/2006 | Anderson |
| 2007/0086134 A1 | 4/2007 | Zweigle |
| 2007/0100504 A1 | 5/2007 | Moxley |
| 2007/0103004 A1 | 5/2007 | Chou |
| 2007/0219755 A1 | 9/2007 | Williams |
| 2007/0222294 A1 | 9/2007 | Tsukida |
| 2007/0239372 A1 | 10/2007 | Schweitzer |
| 2008/0040296 A1 | 2/2008 | Bridges |
| 2008/0204044 A1 | 8/2008 | Ponnaluri |
| 2008/0232005 A1 | 9/2008 | Kuehnle |
| 2008/0281540 A1 | 11/2008 | Zweigle |
| 2009/0021082 A1 | 1/2009 | Loucks |
| 2009/0079266 A1 | 3/2009 | McNamara |
| 2009/0085407 A1 | 4/2009 | Venkatasubramanian |
| 2009/0088989 A1 | 4/2009 | Guzman |
| 2009/0088990 A1 | 4/2009 | Schweitzer |
| 2009/0089608 A1 | 4/2009 | Guzman |
| 2009/0091867 A1 | 4/2009 | Guzman |
| 2009/0099798 A1 | 4/2009 | Gong |
| 2009/0125158 A1 | 5/2009 | Schweitzer |
| 2009/0198383 A1 | 8/2009 | Gardner |
| 2009/0254655 A1 | 10/2009 | Kidwell |
| 2009/0276173 A1 | 11/2009 | Wang |
| 2010/0002348 A1 | 1/2010 | Donolo |
| 2010/0104847 A1 | 4/2010 | Ciavatta |
| 2010/0114390 A1 | 5/2010 | Stevenson |
| 2010/0145536 A1 | 6/2010 | Masters |
| 2010/0152910 A1 | 6/2010 | Taft |
| 2010/0198423 A1 | 8/2010 | Hirst |
| 2011/0004324 A1 | 1/2011 | Bickel |
| 2011/0022734 A1 | 1/2011 | Etheridge |
| 2011/0062708 A1 | 3/2011 | Prochaska |
| 2011/0068576 A1 | 3/2011 | Meier |
| 2011/0077885 A1 | 3/2011 | Zweigle |
| 2011/0190958 A1 | 8/2011 | Hirst |
| 2011/0213606 A1 | 9/2011 | Seaman |
| 2011/0251732 A1 | 10/2011 | Schweitzer |
| 2011/0298286 A1 | 12/2011 | Batzler |
| 2012/0065805 A1* | 3/2012 | Montalvo ............. G06Q 10/06 700/297 |
| 2012/0226386 A1 | 9/2012 | Kulathu |
| 2015/0171662 A1* | 6/2015 | Lathrop ................ H02J 9/066 307/64 |
| 2016/0190866 A1* | 6/2016 | Pelletier .................. H02J 3/32 307/64 |
| 2016/0254666 A1* | 9/2016 | Curtiss ................... H02J 3/006 700/292 |

OTHER PUBLICATIONS

Krishnanjan Gubba Ravikumar, Brandon Bosley, Julio Garcia, Ty Clark, "Isochronous Load Sharing Principles for an Islanded System with Steam and Gas Turbine Generators" 64th Annual Petroleum and Chemical Industry Technical Conference, Sep. 18-20, 2017.

William Edwards, Scott Manson, Jakov Vico, "Microgrid Islanding and Grid Restoration with Off-the-Shelf Utility Protection Equipment" IEEE International Humanitarian Technology Conference, Jul. 2017.

Krishnanjan Gubba Ravikumar, Ashish Upreti, Adithiya Nagarajan, "State-of-the-Art Islanding Detection and Decoupling Systems for Utility and Industrial Power Systems" 69th Annual Georgia Tech Protective Relaying Conference, Apr. 29-May 1, 2015.

* cited by examiner

OPTIMIZED DECOUPLING AND LOAD SHEDDING

TECHNICAL FIELD

The present disclosure relates to load shedding systems and methods to limit back to back load shedding actions.

BRIEF DESCRIPTION OF THE DRAWINGS

Non-limiting and non-exhaustive embodiments of the disclosure are described herein, including various embodiments of the disclosure with reference to the figures listed below.

In the following description, numerous specific details are provided for a thorough understanding of the various embodiments disclosed herein. The systems and methods disclosed herein can be practiced without one or more of the specific details, or with other methods, components, materials, etc. In addition, in some cases, well-known structures, materials, or operations may not be shown or described in detail in order to avoid obscuring aspects of the disclosure. Furthermore, the described features, structures, or characteristics may be combined in any suitable manner in one or more alternative embodiments.

DETAILED DESCRIPTION

This disclosure provides methods and systems to reduce the number of loads a power system may shed during an overload event. Some embodiments provide methods and systems that a small microgrid may use to optimize the loads to be shed by simulating multiple possible processes in parallel and performing the process that provides a result closest to a set of predefined preferences.

A power system may comprise a utility providing power and one or more microgrids receiving at least some power from the utility and producing an additional amount of power. The utility and microgrid are connected via a point of common coupling (PCC). The microgrid may comprise local generators and various loads. Instability in the microgrid may occur when available power is insufficient for the various loads. For example, an overload condition occurs when the load demand of the microgrid exceeds the available power from the utility and the local generators. This may occur if a generator on the microgrid fails, a new load is added, or the current loads have an increased power demand.

In the event of an overload condition, some load shedding systems may maintain a connection between the utility and the microgrid across the PCC, and allow both the utility and local generators to increase their power output to compensate for the insufficient power. The power received from the utility may increase up to a utility import capacity limit. Each generator may have an incremental reserve margin (IRM) that may be used to increase the generator power output within an allowable frequency limit. Some microgrids attempt to use both the IRM and the utility import to compensate for an overload condition and attempt to reduce the number of loads needed to be shed.

However, using both the IRM and the utility import may result in microgrid and/or utility instability. For example, if the combination of the utility supplied power and the power supplied by the IRM surpasses the PCC overload protection limit, there may be a cascaded PCC tripping action which will eventually cause another load shedding action due to the extra source loss. Further, the stability of the utility may be compromised when back to back (cascaded) load shedding actions occur. If the stability of the utility is lost, the power system may have a blackout.

One alternative to using both the utility import capacity and the IRM of the generators is to draw the additional power needed from only one source. For instance, in some embodiments load shedding systems may effectively zero out the IRMs when the grid is utility connected. This approach may shed more loads in some instances than considering both the utility import capacity and the IRM, but ensures that the PCC does not get overloaded. Also, this method ensures that the load shedding occurs in a single event. In some embodiments, the IRM of the local generators may be used and the utility decoupled from the microgrid. One of these approaches may produce a more optimized result than the other.

The present disclosure provides systems and methods that simulate multiple possible load shedding actions to prevent back to back load shedding actions and predetermine which load shedding action aligns most closely with a set of preferences. The system of the present disclosure may preserve the stability of the microgrid and utility, and limit the number of loads to be shed. For some overload events, it may be beneficial in some situations to decouple the microgrid from the utility during an overload condition, and allow the IRM of the local generators to be used before the number of loads to shed is determined. For other overload events, it may be beneficial in other situations to maintain a connection between the utility and the microgrid across the PCC and not consider the IRM of the local generators. The system of the present disclosure may determine and implement the course of action that results in the load shedding action that best preserves the stability of the utility and reduces the amount of loads to shed.

Additional details and examples are provided with reference to the figures below. Generally speaking, the systems and methods disclosed herein may be adapted to interface with or be included as part of a protection element or protection ecosystem, such as a power system protection relay. Such protection devices may be configured to communicate with, control, operate, energize, de-energize, and/or disengage one or more power system components and provide an indication of where a potential fault has occurred. Protection relays may be installed in electric power transmission and distribution facilities to detect overloads, short circuits, and other fault conditions.

Many embodiments of a protective relay include electronic devices employing FPGAs, microcontrollers, CPUs, ND converters, electronic displays, communication ports, and other electronic devices and systems to digitize power system current and/or voltage measurements, and process data associated with the digitized currents and voltages according to various algorithms and/or digital filters. A protective relay may be configured to make protection decisions based on data associated with a digitized power system's currents and/or voltages, and may communicate decisions made by a protective relay to an appropriate system or personnel, and/or may otherwise cause a suitable response to the digitized power system's currents and/or voltages.

An intelligent electronic device (IED), which may be used for monitoring, protecting, and/or controlling industrial and utility equipment, such as in electric power delivery systems, may include system components to implement a method for identifying fault locations using the two sequence network approaches described herein. Such IEDs may be configured to use a single-ended two sequence network approach or a double-ended two sequence network approach. In both of these embodiments, the IED is able to provide accurate fault location information even during a pole-open event.

The phrases "connected to" and "in communication with" refer to any form of interaction between two or more components, including mechanical, electrical, magnetic, and electromagnetic interaction. Two components may be connected to each other, even though they are not in direct contact with each other, and even though there may be intermediary devices between the two components.

As used herein, the term IED may refer to any microprocessor-based device that monitors, controls, automates, and/or protects monitored equipment within a system. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, motor drives, and the like. IEDs may be connected to a network, and communication on the network may be facilitated by networking devices including, but not limited to, multiplexers, routers, hubs, gateways, firewalls, and switches. Furthermore, networking and communication devices may be incorporated in an IED or be in communication with an IED. The term IED may be used interchangeably to describe an individual IED or a system comprising multiple IEDs.

Some of the infrastructure that can be used with embodiments disclosed herein is already available, such as: general-purpose computers, computer programming tools and techniques, digital storage media, and communications networks. A computer may include a processor, such as a microprocessor, microcontroller, logic circuitry, or the like. The processor may include a special-purpose processing device, such as an ASIC, PAL, PLA, PLD, CPLD, Field Programmable Gate Array (FPGA), or other customized or programmable device. The computer may also include a computer-readable storage device, such as non-volatile memory, static RAM, dynamic RAM, ROM, CD-ROM, disk, tape, magnetic, optical, flash memory, or other computer-readable storage medium.

Suitable networks for configuration and/or use, as described herein, include any of a wide variety of network infrastructures. Specifically, a network may incorporate landlines, wireless communication, optical connections, various modulators, demodulators, small form-factor pluggable (SFP) transceivers, routers, hubs, switches, and/or other networking equipment.

The network may include communications or networking software, such as software available from Novell, Microsoft, Artisoft, and other vendors, and may operate using TCP/IP, SPX, IPX, SONET, and other protocols over twisted pair, coaxial, or optical fiber cables, telephone lines, satellites, microwave relays, modulated AC power lines, physical media transfer, wireless radio links, and/or other data transmission "wires." The network may encompass smaller networks and/or be connectable to other networks through a gateway or similar mechanism.

Aspects of certain embodiments described herein may be implemented as software modules or components. As used herein, a software module or component may include any type of computer instruction or computer-executable code located within or on a computer-readable storage medium, such as a non-transitory computer-readable medium. A software module may, for instance, comprise one or more physical or logical blocks of computer instructions, which may be organized as a routine, program, object, component, data structure, etc., that perform one or more tasks or implement particular data types, algorithms, and/or methods.

A particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media. Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network.

The embodiments of the disclosure can be understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments.

Figure 1:
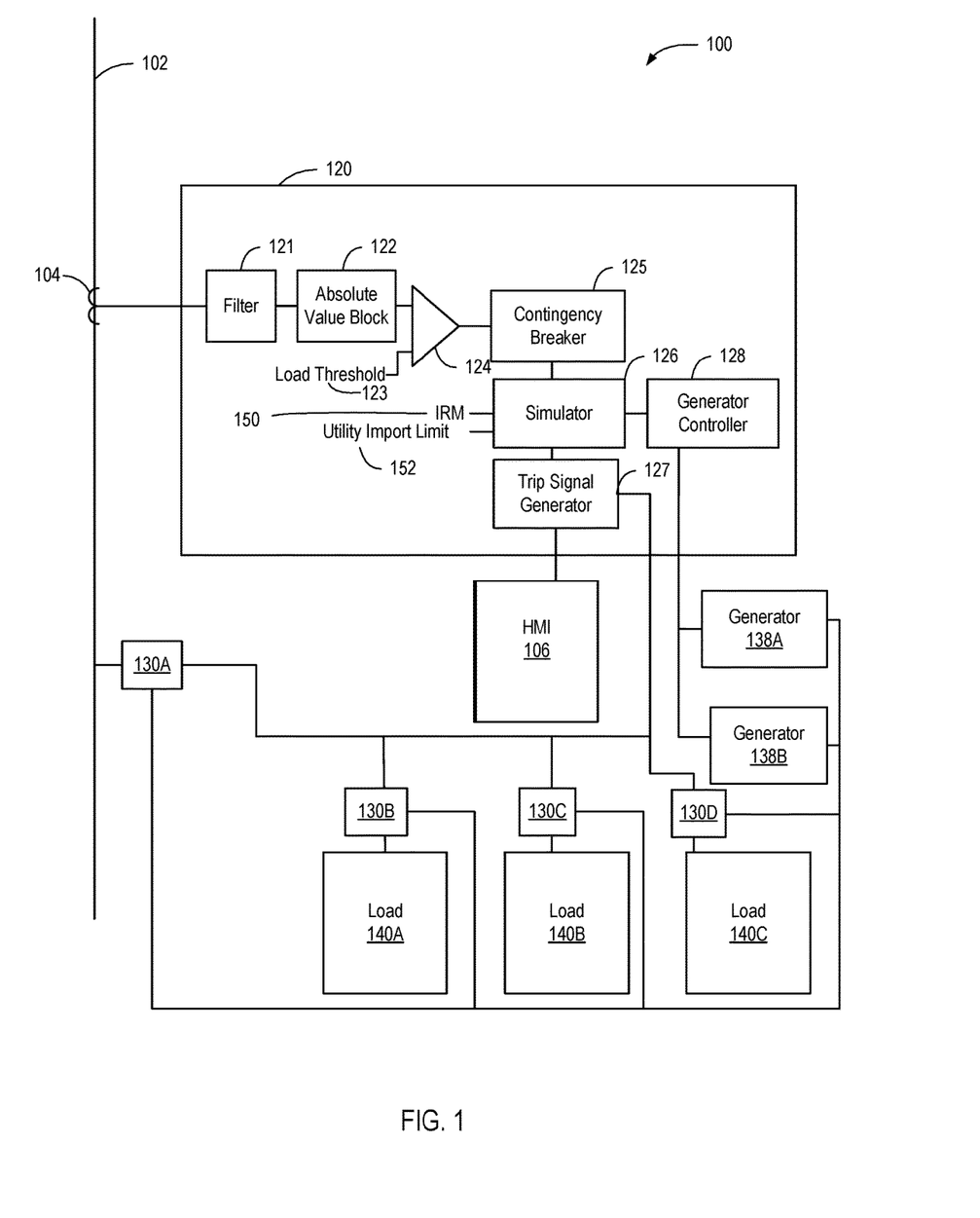
FIG. 1 illustrates a load shedding system, according to one embodiment.

FIG. 1 illustrates a load shedding system 100, according to one embodiment. As shown, components of the load shedding system 100 may be integrated in an IED 120. In some embodiments, various components may independent from the IED 120. According to various embodiments, the load shedding system 100 may be used to control, determine, and execute load shedding processes. The load shedding processes determine which if any loads must be shed when the load demand exceeds the available power from the utility. When the load demand exceeds the available power from the utility, the load shedding system 100 may determine which process from a plurality of processes to implement to preserve the stability of the utility and reduce the amount of loads to shed.

According to FIG. 1, the load shedding system 100 may comprise the IED 120, a current transformer (CT) 104, a human machine interface (HMI) 106, and a plurality of breakers 130A, 130B, 130C, 130D (collectively referred to herein as breakers 130). The load shedding system 100 may control power received from a utility line 102, power generated by a plurality of local generators (e.g., 138A, 138B), collectively referred to herein as generators 138), and power consumed by a plurality of loads (e.g., 140A, 140B, 140C, collectively referred to herein as loads 140). The IED 120 of the load shedding system 100 may comprise a filter 121, an absolute value block 122, a comparator 124, a contingency breaker 125, a simulator 126, a trip signal generator 127, and a generator controller 128. The IED 120 may couple to the utility line 102 via the CT 104, to the local generators 138 via the generator controller 128, and to the breakers 130 and the HMI 106 via the trip signal generator 127.

The plurality of breakers 130 comprises a utility breaker (PCC) 130A as well as a load breaker 130B, 130C, and 130D for each respective load 140A, 140B, 140C. The utility breaker 130A may allow power from the utility line 102 to pass to the load breakers 130B, 130C, 130D. The utility breaker 130 may be opened to prevent power from the utility line 102 from passing to the load breakers 130B, 130C, 130D. The trip signal generator 127 may send a trip signal to cause the utility breaker 130A to trip. Similarly, the load breakers 130B, 130C, 130D may selectively allow power from the utility line 102 and the local generators 138A, 138B to pass to the loads 140 based on whether the trip signal generator 127 sends a trip signal to the load breakers 130B, 130C, 130D.

According to various embodiments, the load shedding system 100 may isolate a current signal for measurement from the utility line 102 via the CT 104, determine if there is a power deficiency based on a load threshold 123, and determine which loads 140 to shed while maintaining an appropriate connection to the utility line 102. Specifically, the IED 120 of the load shedding system 100 may receive the current signal from the utility line 102 via the CT 104, filter the signal through the filter 121, take the absolute value of the filtered signal through the absolute value block 122, and compare the magnitude of the filtered signal against the load threshold 123 via the comparator 124. The load threshold 123 is the current demand from the loads 140. In some embodiments other electrical sensors may be used such as a voltage sensor.

If the magnitude of the current signal is greater than the load threshold 123, then the contingency breaker 125 may remain open, preventing the simulator 126 from operating. If the load threshold 123 is greater than the magnitude of the available power, then the contingency breaker 125 will close, and the simulator 126 may determine a load shedding action to take in response to a current overload condition. The load shedding action includes a behavior of the local generators, a status of the utility breaker 130A, and determining which loads 140 to shed.

The simulator 126 may receive a reading of available power from the utility line 102 via the contingency breaker 125, a measure of an IRM 150 of the local generators 138A, 138B, and a measure of a utility import limit 152. The simulator 126 outputs commands to the generator controller 128 and the trip signal generator 127 to control breakers 130 and generators 138. The simulator 126 may execute simulations of multiple processes and determine which process to implement based on the available power from the utility, the contingency breaker 125, and the IRM 150.

To execute some load shedding processes, the simulator 126 may output commands to the generator controller 128 to maintain the current output of the local generators 138A, 138B. Alternatively, the simulator 126 may output commands to the generator controller 128 to use their IRMs. Also, to execute some load shedding processes, the simulator 126 may output a command to the trip signal generator 127 to open or close the utility breaker 130A, and to open or close various load breakers 130B, 130C, 130D.

According to various embodiments, the HMI 106 may receive data from the trip signal generator 127. The HMI 106 may be local or at a remote location. The HMI 106 can indicate to a user(s) the status of various breakers 130. In some embodiments, the HMI 106 may also receive data from the generator controller 128 such that the HMI 106 can indicate to a user(s) the status of the local generators 138. The HMI 106 may comprise any mechanism necessary to relay information to the user. For example, the HMI 106 may comprise a screen, lights, speakers, or some other appropriate device for conveying information to users or technicians.

The load shedding system 100 of FIG. 1 may also comprise a communications interface, wherein the user(s) may indicate preferences on load shedding schemes. For example, the user(s) may select via the communications interface default protocols, and/or load priorities.

Figure 2:
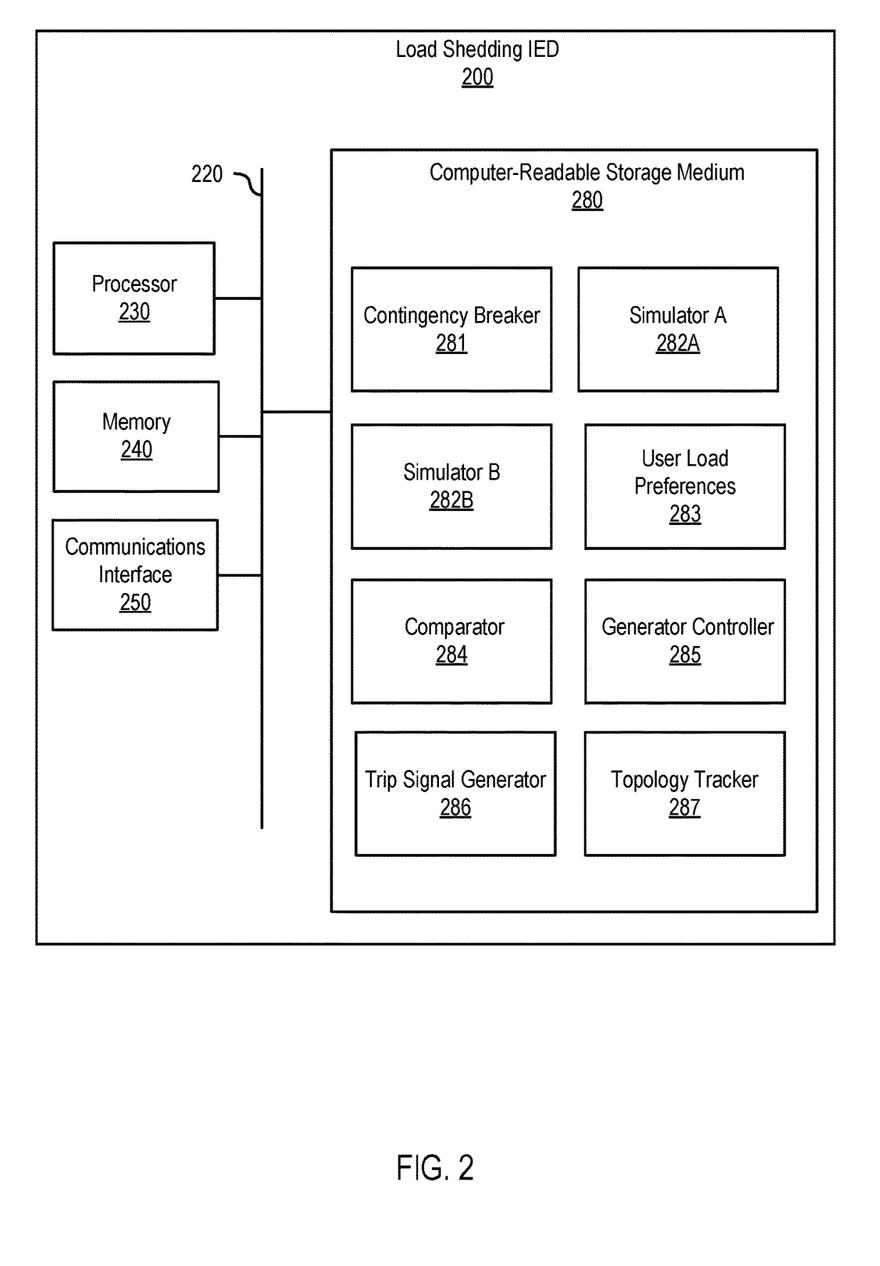
FIG. 2 illustrates a load shedding intelligent electrical device, according to one embodiment.

FIG. 2 illustrates a load shedding IED 200, according to one embodiment. The load shedding IED 200 may be implemented on an FPGA or general computing device that may be programmed using any one of many hardware description languages for digital circuit design. According to various embodiments, the load shedding IED 200 may be used to control, determine, and execute load shedding processes. The load shedding processes determine which if any loads must be shed when load demand exceeds the available power from the utility and generators. When the load demand exceeds the available power from the utility, the process that the load shedding IED 200 implements may preserve the stability of the utility and reduce the amount of loads to shed.

The load shedding IED 200 may comprise a processor 230, memory 240, a communications interface 250, and a computer-readable storage medium 280. A bus 220 may connect the processor 230, memory 240, a communications interface 250, and computer-readable storage medium 280. In various embodiments, the processor 230 may be a general-purpose processor to perform tasks such as computing and/or compiling; the memory 240 may be RAM, ROM, or any other suitable data storage medium; and the communications interface 250 may be an interface to communicate with various breakers (such as a PCC between the utility and various loads), generators, loads, HMIs, utility power lines, and/or external or internal processors or IEDs.

The memory 240 and the computer-readable storage medium 280 may be any piece of hardware capable of storing information such as data, computer programs, and/or other suitable information. The memory 240 may include volatile memory and/or non-volatile memory, and may be fixed or removable. The memory 240 may include RAM, ROM, a hard drive, a flash memory, a thumb drive, an optical disk, a magnetic tape, or some combination of the above. In one embodiment, the memory 240 may be used to store instructions to be executed by the processor 230.

The computer-readable storage medium 280 may be a non-transitory memory device, according to one embodiment, and include any number of modules 281-287 for performing load shedding. In some embodiments, one or more of the modules 281-287 may include computer-executable instructions to perform various functions for load shedding. In some embodiments, one or more of the modules 281-287 may be implemented in hardware, firmware, software, and/or some combination thereof. In some embodiments, one or more of the modules 281-287 may be implemented in a cloud-based or remote location and interface via a communication interface, such as the communications interface 250.

The computer-readable storage medium 280 may comprise a contingency breaker 281, simulations 282A, 282B, user load preferences 283, a comparator 284, a generator controller 285, a trip signal generator 286, and/or a topology tracker 287. According to various embodiments, the contingency breaker 281 may issue a command for the processor 230 to execute the simulations 282A, 282B.

The contingency breaker 281 of the computer-readable storage medium 280 may receive a load threshold (the power requested by the loads) as well as the available power from the utility and from the generators to determine if a load shedding action should be performed. The contingency breaker 281 may determine a load shedding action should be performed based on a result from the comparator 284. The comparator 284 may compare the load demand and the available power from the utility and the generators and pass the comparison results to the contingency breaker 281. The results may include a value representing a differential between the load demand and the available power from the utility. If the load demand is greater than the available power, the contingency breaker 281 causes the processor 230 to execute simulators 282A, 282B. The simulators 282A, 282B may determine a process for shedding loads. In other embodiments, the contingency breaker 281 may be external to the IED and may send a signal to the IED regarding a result of a comparator comparing thee load demand and the available power from the utility.

Simulator A 282A may determine an outcome of a load shedding process where local generators use their IRM and power from the utility line is not used. Simulator B 282B may determine an outcome of a load shedding process where local generators do not use their IRM and power from the utility line is used.

The outcomes of both of these two processes may be compared to the user load preferences 283. The user load preferences 283 may be a collection of data from a user or technician. For example, the user load preferences 283 may be or include a list of loads that are deemed critical and are to be removed from any consideration of being shed, or for which there is a desire to stay connected to the utility.

After it is determined which simulation results in an outcome that best matches the user load preferences 283, the generator controller 285 and the trip signal generator 286 may prepare and send signals to execute the process of that simulation. For example, the generator controller 285 may command local generators to use or not use IRM, and the trip signal generator 286 may command one or more breaker(s) to trip. For example, if the IRMs of the generators are used, the trip signal generator 286 may send a signal to the PCC between the utility line to trip.

The load shedding IED 200 may use the topology tracker 287 to track current loads and islands on a microgrid. Additionally, the topology tracker 287 may determine the load demands, the number of loads, the IRM of the generators, and/or the available power from the utility. The topology tracker 287 may update after each load shedding action.

Although the computer-readable storage medium 280 comprises two simulators 282A, 282B, the computer-readable storage medium 280 may comprise additional simulations similar to simulators 282A, 282B. For example, redundant simulations may be used to secure reliability in the load shedding process. In some embodiments, the computer-readable storage medium 280 may comprise a single simulation, and redundant simulations may be implemented on external IEDs or external computer-readable storage mediums.

Figure 3:
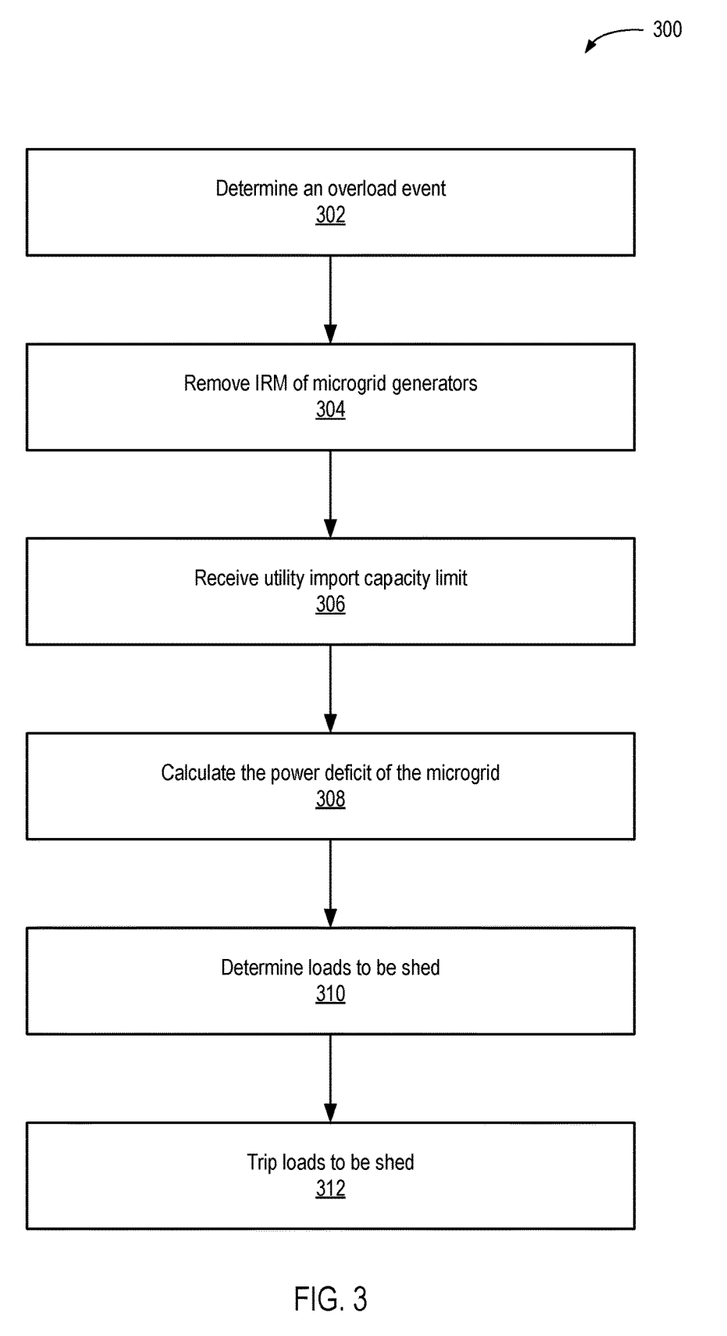
FIG. 3 illustrates a method of load shedding that may prevent or reduce the chance of cascaded load shedding events, according to one embodiment.

FIG. 3 illustrates a method 300 of a load shedding system that may prevent or reduce the chance of cascaded load shedding events, according to one embodiment. The method 300 may be performed by the load shedding system 100 of FIG. 1, or the load shedding IED 200 of FIG. 2.

A power system may comprise a utility and a microgrid. The microgrid may comprise local generators and loads, and the utility may be connected to the microgrid via a point of common coupling (PCC). When the power provided by the utility and the power provided by the local generators is less than the load threshold or load demand, it may be necessary to shed loads. Typical events that trigger load shedding are loss of a source (one or more generators), overload condition due to load startup, etc.

To limit the number of loads shed, a microgrid may increase available power. Generators may include an IRM. The IRM is a reserve of power that can be delivered when the load threshold increases beyond the current local generator output. It is also possible for the utility to increase power provided to a microgrid up to the utility import capacity limit.

However, if both the utility and the local generators increase their output when the load threshold increases, a cascaded load shedding event may occur. The cascaded load shed may cause more loads to be shed than necessary and/or the stability of the utility becomes compromised. If both the IRM of the local generators and the steady state import from the utility were used, a potential overcurrent condition may trip generator or utility breakers, causing another overload condition. In order to prevent or reduce the chance of cascaded load shedding events, and to better preserve the stability of the utility, the method 300 of FIG. 3 maintains a connection between the utility and the microgrid, and does not include the IRM of the local generators. If only the power from the utility is considered, excessive load shedding within the microgrid may occur, but the connection across the PCC is preserved and the load shedding occurs in one single load shedding action.

The method 300 is initiated by determining 302 that an overload event has occurred. The method 300 further includes removing 304 the IRM of the microgrid generators. For example, the method 300 may cause a load shedding system to send a signal to the microgrid generators requesting that the power output be limited to a current power level. With no additional power being generated by the microgrid generators, the method 300 may cause a microgrid to receive 306 a steady state import from the utility up to the utility import capacity limit for additional power without concern of an overcurrent condition.

The method 300 further includes calculating 308 the power deficit of the microgrid. This may be done by taking the difference between the requested power of the microgrid and the available power of the utility. The available power of the utility includes the steady state import across the PCC. For example, a microgrid may receive a steady state import of 40 MW across the PCC, and the microgrid may request a total of 60 MW. In this example, the power deficit of the microgrid would be 20 MW. According to the example, if the PCC limit were 40 MW, the microgrid would need to shed 20 MW of load in order to avoid tripping the PCC breaker.

The method 300 further includes determining 310 the loads to be shed. A load may be determined to be available or unavailable by user preferences. For example, if a particular load is deemed critical, a user may assign the load to be unavailable and other combinations of available loads will be assigned to be shed in an overload condition. The method 300 also includes tripping 312 the loads to be shed. This may be done by consolidating the selected loads and cross-tripping their breakers as a load group in a single event.

The method 300 may prevent tripping the PCC and prevent cascaded load shedding, but may also result in excessive load shedding because it does not consider the IRM of the generators. For example, the utility may provide a steady state import of 40 MW across the PCC to the microgrid, the PCC may have a utility import capacity limit of 50 MW, and the microgrid may request 60 MW of power across the PCC. In this example, the IRM of the microgrid generators may have a collective IRM of 55 MW. According to the method 300, the load shedding system would remove 304 the IRM of the microgrid generators (55 MW), receive 306 the utility import capacity limit (50 MW), calculate 308 the power deficit of the microgrid (10 MW), and determine 310 and trip 312 a 10 MW load group. The utility would then increase the steady state import from 40 MW to 50 MW. In this example, the IRM of the local generators had enough reserve to shed less load than the method 300. Specifically, if the microgrid relied exclusively on the IRM of the microgrid generators rather than the utility, it would only be necessary to shed 5 MW of load rather than 10 MW.

Figure 4:
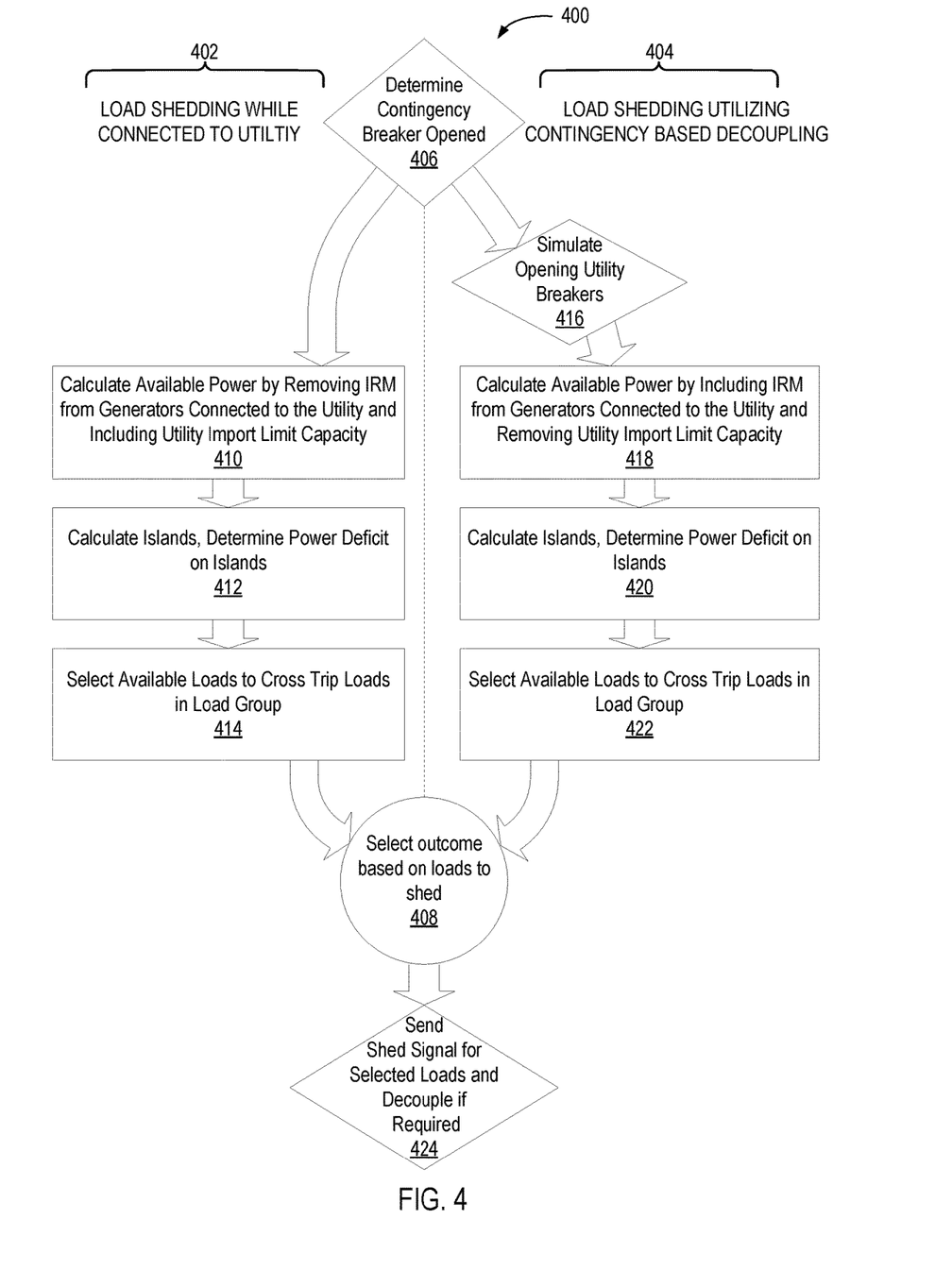
FIG. 4 illustrates a method for managing load shedding on a microgrid during an overload condition using a first process and a second process.

FIG. 4 illustrates a method 400 for managing load shedding on a microgrid during an overload condition using a first process 402 and a second process 404. The first process 402 may be substantially similar to the method 300 described in FIG. 3. In the first process 402 the IRM of local generators is not considered, and power is received from the utility. The second process 404 differs in that it considers the IRM of local generators, but does not receive power from the utility (e.g., as if the utility were disconnected, and not considering the utility import limit capacity). Both the first and second processes 402, 404 may reduce the impact of load shedding events by reducing the chance of a cascaded load shedding event. The method 400 compares the results of the first and second processes 402, 404, and selects 408 the process that best optimizes load shedding events according to user preferences.

The first and second processes 402, 404 are simulations that yield predictions of utility stability and loads to shed using two different approaches. Each process is a simulation. Once the optimal process (either the first process 402 or the second process 404) is selected 408, it is implemented 424.

The method 400 may be initiated by determining 406 that a contingency breaker has opened. In one embodiment, the contingency breaker opens during an overload condition. The first and second processes 402, 404 are performed to determine loads that would be shed using two different scenarios. According to one embodiment, the first and second processes 402, 404 are performed in parallel. In an alternative embodiment, the first and second processes 402, 404 are performed sequentially.

The first process 402 of the method 400 is similar to the method 300 of FIG. 3. Specifically, upon determining 406 that the contingency breaker has opened, the first process 402 of the method 400 simulates preserving a connection between the utility and the microgrid. The first process 402 calculates 410 the available power without the IRM of the microgrid generators and with the utility import limit capacity. The first process 402 of the method 400 includes calculating 412 the power deficit of the microgrid and islands. This is done by taking the difference between the requested power of the microgrid and the available power of the utility. The first process 402 of the method 400 further includes selecting 414 the available loads and simulating cross-tripping (shedding) the available loads as a load group in a single event.

The second process 404 of the method 400 differs from the first process 402 of the method 400 in that its simulation discounts the utility power by disconnecting from it, and only counts the IRM of the local generators. Once it is determined 406 that the contingency breaker has opened, the second process 404 of the method 400 simulates 416 opening the utility breakers (to disconnect from the utility). The second process 404 of the method 400 includes calculating 418 available power using the IRM of the microgrid generators and removing the utility import limit capacity. The second process 404 of the method 400 also includes calculating 420 the power deficit of the microgrid. This is done by taking the difference between the requested power of the microgrid and the available power of the local generators including the IRM. The second process 404 of the method 400 further includes selecting 422 the available loads and simulating cross-tripping (shedding) the available loads as a load group in a single event.

The method 400 also includes selecting 408 one of the results of the first and second processes 402, 404 to implement. Specifically, the first and second processes 402, 404 may be compared against one another to see which of the two will provide better stability of the utility and shed the smallest load. For example, in some embodiments, the processes 402, 404 with the fewest loads shed may be implemented.

Both the first and second processes 402, 404 may account for user preferences, thereby removing critical loads from consideration. In embodiments where the user preferences are taken into account, the process with the results that best conform to the user preferences, system stability, and load shedding targets is selected, for example, if the first process 402 of the method 400 yields a group of loads that closely approximates a load shedding target, while the second process 404 of the method 400 yields a group of loads that is further from approximating the load shedding target than that of the first process 402, then the first process 402 would be selected for implementation. However (according to the example), if user preferences were accounted for, the first process 402 may yield a new group of loads to avoid selecting loads deemed critical by the user, wherein the new group of loads approximates the load shedding target with a margin of error that is greater than the second process 404. In this example, if the second process 404 yields a load group that has no loads deemed critical by the user, the second process 404 would be selected for implementation.

According to one embodiment, if both the first and second processes 402, 404 yield the same result, the first process 402 is selected by default. In alternative embodiments, if both the first and second processes 402, 404 yield the same result, the second process 404 is selected by default. The default selection may be constructed based on user preferences. For example, if the user decides that it is important to maintain a connection to the utility through the PCC (e.g., for stability reasons), then the first process 402 would be selected by default.

The process selected at 408 is implemented by the load shedding system sending 424 a signal to the microgrid, causing the selected available loads to decouple. If required (if the second process 404 is selected at 408), a signal is also sent to decouple the microgrid from the utility. In various embodiments, the utility may be coupled to the microgrid via a relay or breaker, and the loads may be coupled to the microgrid via relays or breakers. When the first or second process 402, 404 is implemented at 424, the signal to shed loads may be a signal to disconnect the relays or open the breakers between the selected loads and the microgrid, thereby decoupling the loads from the microgrid. Likewise, if it is required that the microgrid be decoupled from the utility, the signal to decouple the two may be a signal to open the breaker or disconnect the relay between the two.

Loads may be selected in a combination such that the collective power requested at least equals the load shedding requirement. In various embodiments, if a small group of loads requests the same amount of power as a large group of loads, the smaller group of loads may be selected for shedding. In various embodiments, the user may allow for particular loads to be made unavailable, such that they cannot be selected for shedding. Such situations may occur when particular loads are deemed critical, or have a higher precedence than other loads.

In an alternative embodiment, the first and second processes 402, 404 are not both performed; rather, only one process is performed (simulated) and implemented. For example, if it is determined by the user that maintaining a connection between the microgrid and the utility has a higher priority over the amount of load to be shed, then the first process 402 may be selected by default. As another example, if it is determined by the user that the intent is to shed the least amount of load (for example, to protect critical process loads), then the second process 404 may be selected by default. In various embodiments, if only one of the first and second processes 402, 404 is to be selected by default and the comparison is abandoned, then the simulation may not be required and the implementation may be initiated immediately after it is determined that the contingency breaker has tripped at 406.

Redundancy may also be implemented by having the processes 402, 404 of the method 400 simulated on separate processors, wherein the processor with more reliable data is selected for implementation. According to one embodiment, three or more processors may simulate the processes 402, 404 of the method 400. According to various embodiments, a processor or group of processors may run a simulation(s) of the processes 402, 404 of the method 400 multiple times.

This disclosure has been made with reference to various embodiments, including the best mode. However, those skilled in the art will recognize that changes and modifications may be made to the embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. The scope of the present invention should, therefore, be determined by the following claims:

The invention claimed is:

1. An intelligent electronic device (IED) for managing load shedding on a microgrid during an overload condition, comprising:
 a communications interface to receive overload condition signals and send signals to manage load shedding;
 a contingency breaker in communication with the communications interface, wherein the contingency breaker trips based on user preferences; and
 a processor to:
  calculate, if the contingency breaker has tripped, a first power deficiency on the microgrid during the overload condition if the microgrid imports power from the utility and does not use incremental reserve margins of generators in the microgrid,
  calculate, if the contingency breaker has tripped, a second power deficiency on the microgrid during the overload condition if the microgrid uses the incremental reserve margins of the generators in the microgrid and does not import power from the utility,
  determine a first set of loads to shed based on the first power deficiency, and a second set of loads to shed based on the second power deficiency if the contingency breaker has tripped, and
  selectively implement a load shedding action based on one of the first and the second sets of loads to shed.

2. The IED of claim 1, wherein the processor compares the first set and the second set of loads to determine which set has the fewest loads, wherein the load shedding action comprises shedding the set with the fewest loads.

3. The IED of claim 1, wherein to implement the load shedding action when the second set of loads is to be shed, the processor:
 signals, via the communications interface, a utility breaker to open;
 prepares a message indicating that the second set of loads should not use power; and
 signals, via the communications interface, the generators in the microgrid to provide the incremental reserve margins.

4. The IED of claim 1, wherein to implement the first load shedding action the processor:
 prepares a message indicating that the first set of loads should not use power, and that the microgrid should maintain a utility connection; and
 signals, via the communications interface, the generators in the microgrid to maintain a current power output.

5. The IED of claim 1, wherein user preferences comprise a priority order for loads in the microgrid, and wherein a load shedding action corresponding to a set with lower priority loads is implemented.

6. The IED of claim 1, wherein if the user preferences indicate that a utility connection should be maintained the first set of loads is shed and the generators in the microgrid maintain a current power output.

7. The IED of claim 1, wherein the processor calculates the first power deficiency and the second power deficiency in parallel.

8. A method for managing load shedding on a microgrid during an overload condition, the method comprising:
 determining, via a processor, a first load shedding action corresponding to the microgrid maintaining a utility connection by:
  calculating a first power deficiency on the microgrid during the overload condition if the microgrid imports power from the utility and does not use incremental reserve margins of generators in the microgrid, and selecting a first set of loads to shed based on the calculated first power deficiency;

determining, via the processor, a second load shedding action corresponding to the microgrid disconnecting the utility connection by:

simulating opening a utility breaker, calculating a second power deficiency on the microgrid during the overload condition if the microgrid uses the incremental reserve margins of the generators in the microgrid and does not import power from the utility, and selecting a second set of loads to shed based on the calculated second power deficiency; and selectively implementing one of the first or the second load shedding action based on one of the first set and the second set of loads to shed by modifying power generation and consumption of the microgrid.

9. The method of claim 8, further comprising comparing the first set and the second set to determine which set has the fewest loads, wherein a load shedding action corresponding to the set with the fewest loads is implemented.

10. The method of claim 8, wherein implementing the second load shedding action comprises:

signaling the utility breaker to open;

preventing loads in the second set of loads from using power; and receiving power from the incremental reserve margins of the generators in the microgrid.

11. The method of claim 8, wherein implementing the first load shedding action comprises:

preventing loads in the first set of loads from using power;

preventing the generators in the microgrid from using the incremental reserve margins; and receiving additional power from the utility.

12. The method of claim 8, wherein implementing one of the first load shedding action or the second load shedding action is further based on customer preferences.

13. The method of claim 12, wherein customer preferences comprise a priority order for loads in the microgrid, and wherein a load shedding action corresponding to a set with lower priority loads is implemented.

14. The method of claim 12, wherein if the customer preferences indicates that the utility connection should be maintained the first load shedding action is implemented.

15. The method of claim 8, wherein determining the first load shedding action and the second load shedding action is done in parallel.

16. A system for managing load shedding on a microgrid during an overload condition, comprising:

a utility breaker configured to selectively remove the microgrid from a utility line;

a contingency breaker to receive an overload condition signal indicating that the microgrid does not have sufficient power for all of the loads on the microgrid, wherein the contingency breaker trips based on user preferences and the overload condition signal; and an intelligent electronic device (IED) in communication with the contingency breaker and the utility breaker, the IED to:

calculate a first power deficiency on the microgrid during the overload condition if the microgrid imports power from the utility and does not use incremental reserve margins of generators in the microgrid, calculate, if the contingency breaker has tripped, a second power deficiency on the microgrid during the overload condition if the microgrid uses the incremental reserve margins of the generators in the microgrid and does not import power from the utility, determine a first set of loads to shed based on the first power deficiency, and a second set of loads to shed based on the second power deficiency if the contingency breaker has tripped, and selectively implement a load shedding action based on one of the first and the second sets of loads to shed to modify power generation and consumption of the microgrid.

17. The system of claim 16, wherein the IED is further to compare the first set and the second set of loads to determine which set has the fewest loads, wherein the load shedding action comprises shedding the set with the fewest loads.

18. The system of claim 16, wherein to implement the load shedding action when the second set of loads is to be shed, the IED: signals the utility breaker to open; interrupts power to the second set of loads; and signals the generators in the microgrid to provide the incremental reserve margins.

19. The system of claim 16, wherein to implement the first load shedding action, the utility breaker remains closed, and the IED:

interrupts power to the first set of loads; and signals the generators in the microgrid to maintain a current power output.

20. The system of claim 16, wherein the IED calculates the first power deficiency and the second power deficiency in parallel.

* * * * *